Dec. 20, 1955     J. H. TAYLOR     2,727,448
SUBSOILING AND EARTH PULVERIZING IMPLEMENTS
Filed Aug. 18, 1952     3 Sheets-Sheet 1

INVENTOR.
Joseph H. Taylor
BY
Attorneys

Dec. 20, 1955  J. H. TAYLOR  2,727,448
SUBSOILING AND EARTH PULVERIZING IMPLEMENTS
Filed Aug. 18, 1952  3 Sheets-Sheet 2
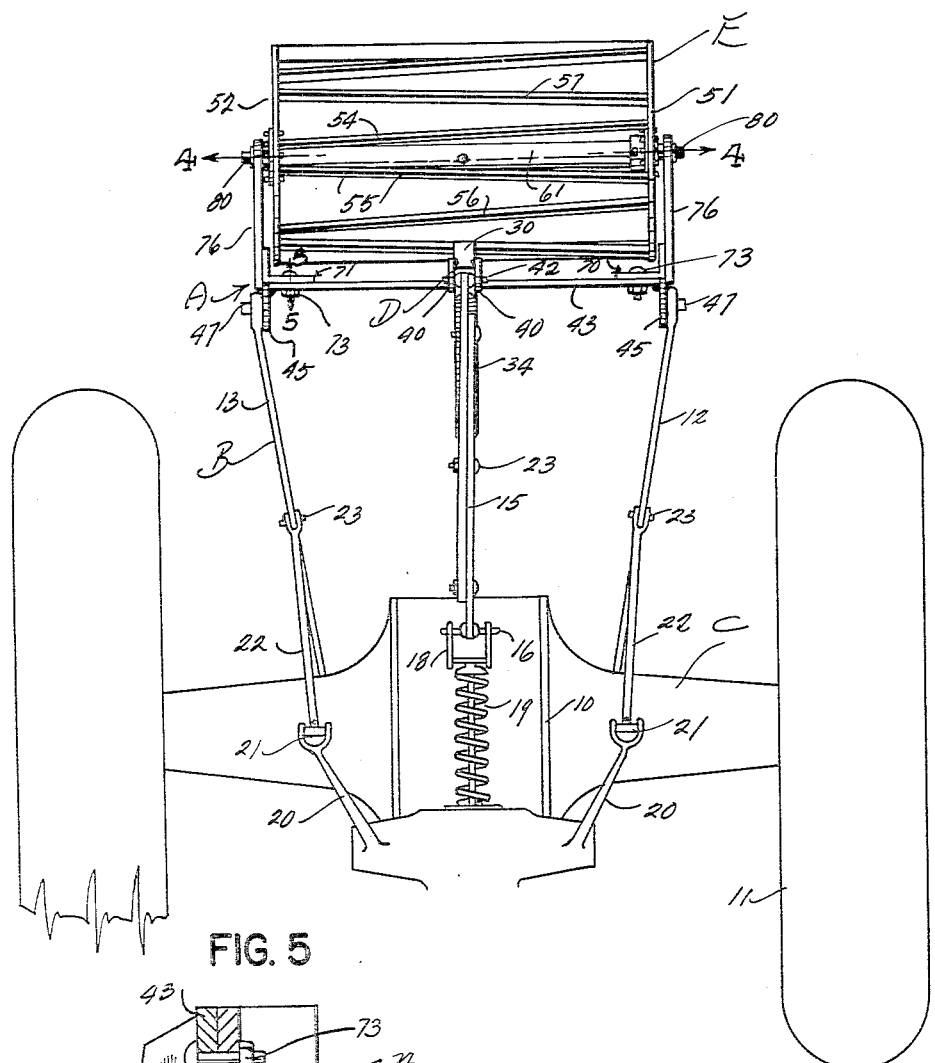
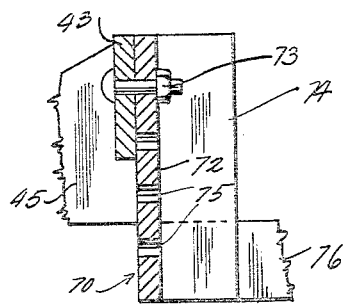
INVENTOR.
Joseph H. Taylor Dec. 20, 1955 J. H. TAYLOR 2,727,448
SUBSOILING AND EARTH PULVERIZING IMPLEMENTS
Filed Aug. 18, 1952 3 Sheets-Sheet 3

INVENTOR.
Joseph H. Taylor
BY
Lancaster, Allwine Rommel
Attorneys

United States Patent Office 2,727,448
Patented Dec. 20, 1955

2,727,448

SUBSOILING AND EARTH PULVERIZING IMPLEMENTS

Joseph H. Taylor, Athens, Tenn.

Application August 18, 1952, Serial No. 304,933

5 Claims. (Cl. 97—6)

This invention relates to improvements in ground working implements, and has particular reference to a subsoiler capable of plowing up the soil and effectively levelling the same.

The primary object of this invention is the provision of an improved tractor drawn subsoiler having a plowing blade disposed so close to the draft connections that free and easy turning on curves results without undue strain on the linkage and other hitch mechanism of the tractor.

A further object of this invention is the provision of a subsoiler having improved means for depth regulation of working.

Conventional subsoilers usually leave furrows and clods of earth which are raised during the plowing action. The present invention embodies not only a plowing element but also pulverizer which follows the subsoiling action, pulverizing and levelling off the ground under such circumstances that wasteful washes and costly erosions are eliminated. In fact the ground is prepared for reseeding or other cultivation under such circumstances that various types of ground working and cultivation are comparatively easy.

Other objects and advantages of this invention will be apparent during the course of the following detailed description.

In the accompanying drawings, forming a part of this specification, and wherein similar reference characters designate corresponding parts throughout the several views:

Fig. 2 is a plan view of the details shown in Fig. 1.

Fig. 5 is a cross sectional view taken on the line 5—5 of Fig. 2, showing more particularly the means for adjusting the depth control of the subsoiling mechanism.

Figures 1, 4:
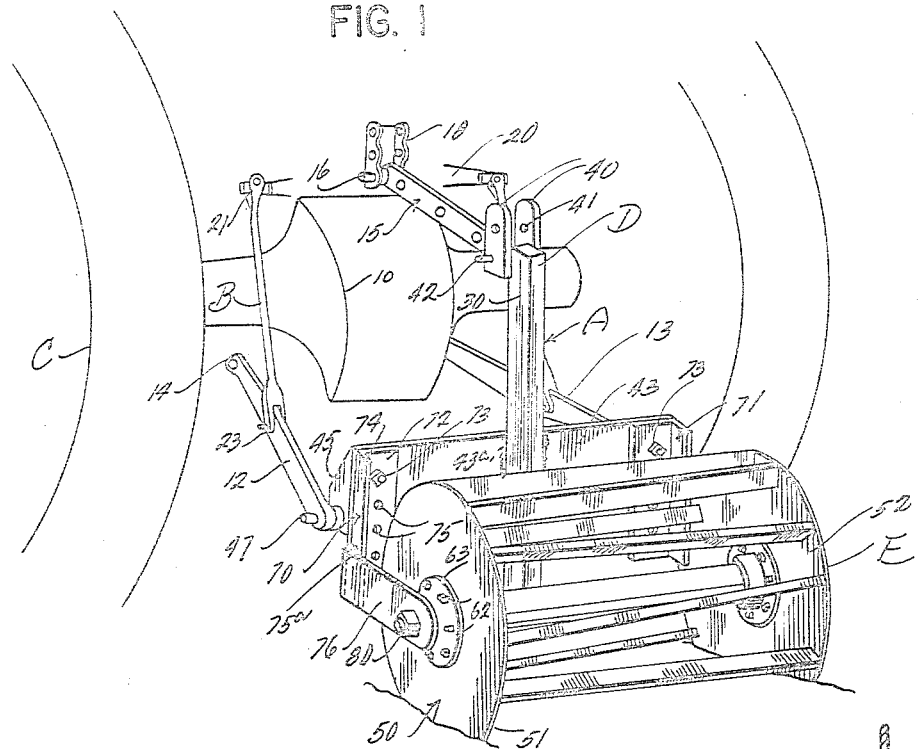
Fig. 1 is a perspective view showing the improved subsoiler and pulverizing mechanism attached to the draft linkage of a tractor.
Fig. 4 is a transverse cross sectional view taken thru the bearing support of the rotary pulverizer, taken substantially on the line 4—4 of Fig. 2.
Figure 3:
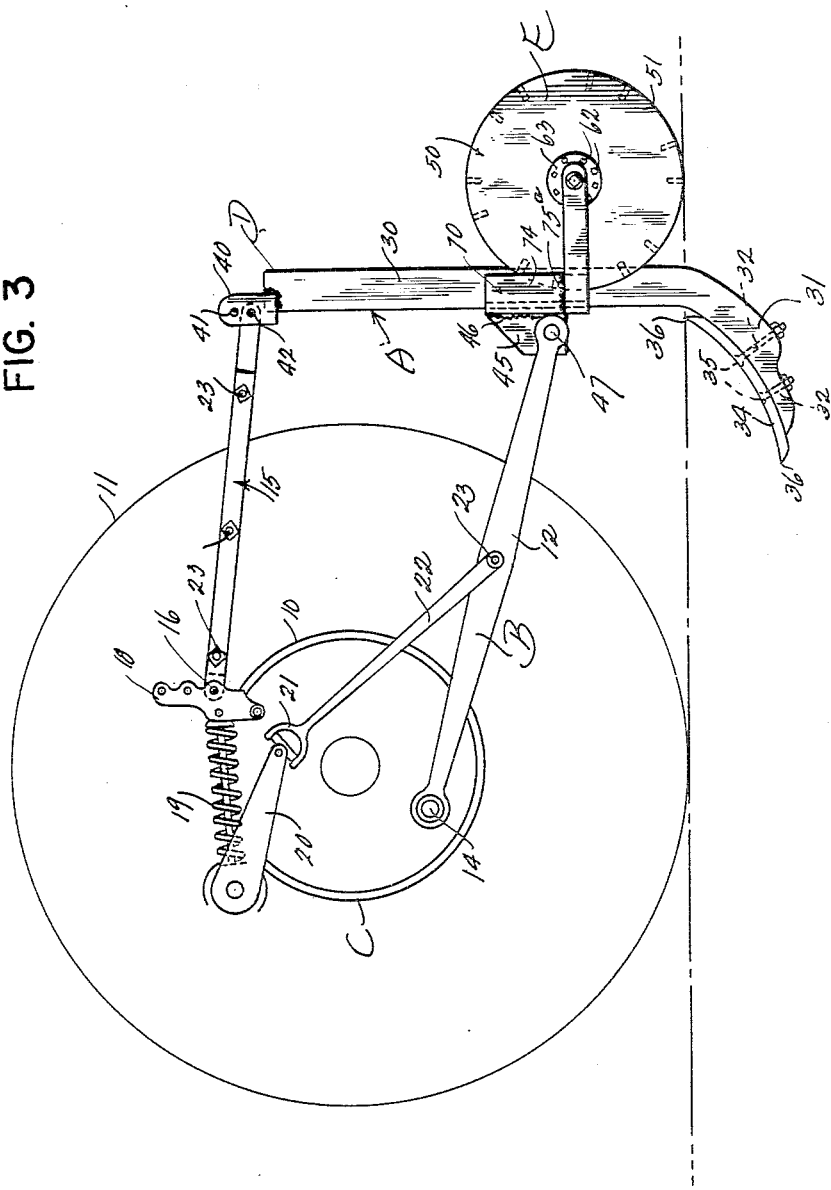
Fig. 3 is a side elevation of the details shown in Fig. 1, showing the relation of the subsoiler and pulverizer with respect to ground level, when in operation.

In the drawings, wherein for the purpose of illustration is shown only a preferred embodiment of the invention, the letter A may generally designate a subsoiling and pulverizing implement adapted for attachment to the linkage connecting means B of a tractor C. The implement A preferably includes a subsoiler D and an earth and clod pulverizer E.

The implement A is adapted for connection to any of various types of power operated tractors, one such is shown in the drawings. It includes the chassis of which the rear axle housing 10 is a part, having the wheels 11 which are power actuated for drive of the tractor. The hitch linkage B of this particular tractor C preferably includes a pair of tension links 12 and 13 swively connected at 14 to the tractor frame so that the same may swing up and down and move laterally within predetermined limits. An upper compression link 15 is swively connected at 16 to the control compression member 18. The latter includes a spring 19, and this type of connection, as is well known in the art, measures reaction forces of ground tools applied to the top linkage 15 and automatically regulates the action of the hydraulic mechanism of the tractor. The power lift mechanism of the tractor includes a set of crank arms 20 having a universal swivel connection 21 with connecting lift links 22. The latter are swively connected at 23 intermediate the ends of the tension links 12 and 13 in a manner well understood by those skilled in this art. The compression or top link 15 is of two part construction and length adjustable by means of bolts 23. One part is pivotally connected at 16 to the member 18 and the other part is pivotally connected to the top of the subsoiler in a manner to be subsequently described.

Referring to the subsoiler D, the parts of the same are of steel, including a sturdy vertically disposed standard 30 having a lower forwardly curved end 31 provided with angled transverse openings 32 therethru. The portion 31 is downwardly and forwardly curved and is adapted to enter the soil together with the subsoiler blade 34. The latter is detachably connected by the bolts 35 (in the openings 32) forwardly of and to the curved portion 31. The subsoiler blade 34 is itself curved and conforms to the curvature of the front surface of the portion 31 of the standard. Both ends 36 thereof have a chisel edge, since it is intended that the blade 34 shall be reversible. Of course, under these circumstances the bolt holes in the blade for the bolts 35 are disposed equidistant from the adjacent ends of the blade.

The top of the standard 30 is provided with a pair of lugs 40 transversely apertured at 41, preferably at a plurality of spaced locations. They receive the swivel connection 42 of the rear end of the compression link 15. These lugs may be welded in place or otherwise secured, as desired.

The means for connecting the subsoiler standard 30 to the tension linkage 12—13 preferably includes a cross bar or member 43, which may be in the form of a plate welded at 43ª to the standard. At its ends the cross member 43 is provided with forwardly angled flanges 45. These may be welded to the plate 43, as shown at 46, in the drawings, or the cross member 43 may have these flanges 45 integral therewith. They are apertured to provide swivel connections 47 for the rear ends of the tension links 12 and 13.

The pulverizer E preferably consists of a rotary drum like wheel 50 having means for rearwardly connecting the same to the cross bar 43 by means enabling it to be vertically adjusted with respect to the subsoiling blade 34. It is within contemplation of this invention to have other openings than the single openings shown in the flanges 45 for the connections 47, and it is also within the contemplation of this invention to provide for vertical adjustable connection of the cross bar 43 upon the standard 30 other than the welded connection, as shown at 43ª in Fig. 1, if so desired.

The rotary mulching drum or wheel preferably comprises a pair of side discs 51 and 52 having transversely connected clod and earth pulverizing and mulching blades or bars connected to the inner faces thereof, and preferably welded in place. These bars are disposed in a zigzagging relation upon the drum and at acute angles to each other as shown in Figs. 1 and 2. That is, one pair of blades or bars 54 and 55 are connected to the disc 51 closer together than the opposite ends are connected to the disc 52. The next adjacent blades 56 and 57 are then connected to the disc 52 the same distance as the blades 54 and 55 are connected to the disc 51, and their opposite ends are connected to the disc 51 the same distance as the ends of the blades 54 and 55 are connected to the disc 52. This continues throughout the circumference of the pulverizing wheel; preferably six sets of blades being provided in such arrangement. The alternate diverging and converging angled relation of the blades from one side to the other assists in effective crushing and pulverizing of the clods as the pulverizer rolls over the ground and also assists in levelling the ground.

The pulverizing wheel 50 is rotatably mounted upon a dead or stationary axle 60. The latter is disposed within an oil or lubricant bearing tube 61. The latter at one end has a ring shaped flange 63, welded as at 64 and at the other end of the axle the ring flange 63a has a sleeve 64a welded thereto. The latter is detachably clamped to the tube 61 by means of a set screw 64a. This permits ready disconnection of the parts. Thrust bearings 65 are located in the tube 61 at the ends thereof, the inner races being mounted at the ends of the shaft 60. The shaft 60 has externally screw threaded reduced ends 66 to receive detachable nuts 67 by means of which to hold packing 68 within the tube 60 at the outer sides of the bearings 65.

The means for connecting the rotary pulverizing drum or wheel 50 to the cross bar or member 43 of the subsoiler preferably consists of a pair of vertically disposed angle bars 70 and 71, the flanges 72 of which are detachably connected by bolts 73 to the bar 43 at the ends thereof. These flanges 72 are vertically apertured at 75 at a plurality of locations to provide for proper vertical disposition of the same upon the bar 43 to suit subsoiler depth and the location of the pulverizer with respect thereto. The other flanges 74 extend rearwardly and to the lower ends thereof are welded, at 75a, the pulverizer drum connecting arms 76. The latter extend rearwardly in right angled relation to the length of the flanges 70 and 71. The arms 76 are transversely apertured at their outer ends, to receive the screw threaded ends 66 of the drum 50; the same being held detachably in place by means of nuts 80 and lock washers 81, or any other desired arrangement that enable easy disconnection of the pulverizer roll and drum from the arms 76.

It is believed that the operation of the improved subsoiler and pulverizer will be apparent from the foregoing. It is to be particularly noted that the entire subsoiling blade assembly is located forwardly of the draft connections of the linkage with the main plowing standard. This closeness and the disposition of the subsoiling blade so near to the tractor permits free and easy turning upon curves without strain upon the parts.

The subsoiling depth and the relation of the pulverizer drum with respect to the subsoiler is permitted through the vertical adjustment of the angles 70 and 71 with respect to the cross (draw) bar 43.

The pulverizer not only crushes and mulches clods of earth after subsoil plowing, but levels the soil as well. This permits easy working of other implements, such as mowers, harvesters, etc., since they require smooth surfacing to avoid damage to cutting blades. Furthermore, the pulverizer levels the furrows ordinarily left by conventional subsoilers and this prevents wasteful washing of the soil and costly erosion. The effective levelling of the earth through the use of the subsoiler and pulverizer effectively conditions the land for reseeding. This is of tremendous advantage in pasture fields where the ground has been trampled down by stock.

It is within contemplation of this invention to provide for other implement attachments upon the subsoiler for cooperative use with the pulverizer, such as seeders and fertilizers.

Various changes may be made to the form of the invention herein shown and described, without departing from the spirit of the invention or scope of the claims.

I claim:

1. A subsoiling implement adapted for connection to a tractor having an upper compression link, and a pair of lower tension links, a vertical standard having means at the upper end thereof for detachable connection to the rear end of the compression link, a cross bar connected to and intermediate the ends of the standard, means at the ends of the cross bar for pivotal connection of the rear ends of the tension links thereto, means at the lower end of said standard for subsoil plowing at a location centrally between the ends of the cross bar, and an earth pulverizing implement connected to said cross bar at the ends thereof and to the rear and above said subsoil plowing means.

2. An instrument as described in claim 1 wherein means are provided upon said cross bar for the vertical adjustment of the pulverizing means with respect to the subsoiling means.

3. A combination subsoiler and earth pulverizer comprising a vertical frame standard, draft connecting means at the top thereof, centrally located subsoiler plow means at the bottom thereof, a substantially horizontally disposed cross draft bar rigidly connected to and across the standard between the top draft connection and the subsoiler plow means, draft connections at the outer ends of said draft bar, a rotary pulverizing wheel, and means connecting the rotary pulverizing wheel on substantially a horizontal axis of rotation to the draft connections of said draft bar.

4. A combination subsoiler and pulverizer as described in claim 3 wherein means is provided for adjusting the vertical effective working distance between the pulverizer and the subsoil plowing means.

5. A plowing implement to be used for plowing and pulverizing soil comprising an upright centrally disposed standard having an elongated substantially horizontally disposed cross bar connected therewith intermediate the ends thereof, a plow connected to the lower end of said standard and extending forwardly of the longitudinal axis of said standard, a draft link connection at the top of said standard located upon the standard to the rear of the plow, draft point connections at the ends of said cross bar located thereupon to the rear of the plow, rearwardly extending arms, means connecting said rearwardly extending arms for vertical adjustment at the ends of the cross bar whereby to vary the location of the rearwardly extending arms with respect to ground level, an elongated earth pulverizing wheel rotatably mounted the rear ends of said rearwardly extending arms, and pulverizing means on said wheel located at a level to the rear of and above the plow.

References Cited in the file of this patent

UNITED STATES PATENTS

| | | |
|---|---|---|
| 610,114 | Weatherly | Aug. 30, 1898 |
| 2,118,181 | Ferguson | May 24, 1938 |
| 2,163,726 | Blunt | June 27, 1939 |
| 2,200,631 | Merlich | May 14, 1940 |
| 2,303,043 | Goodman | Nov. 24, 1942 |
| 2,333,371 | Graham | Nov. 2, 1943 |
| 2,370,777 | Clark | Mar. 6, 1945 |
| 2,566,562 | Hale | Sept. 4, 1951 |
| 2,586,490 | Thompson | Feb. 19, 1952 |
| 2,673,510 | Bailey | Mar. 30, 1954 |
| 2,686,464 | Mang | Aug. 17, 1954 |

FOREIGN PATENTS

| | | |
|---|---|---|
| 812,853 | Germany | Sept. 6, 1951 |
| 661,914 | Britain | Nov. 28, 1951 |